March 24, 1942.    W. R. FREEMAN    2,277,584
BRAKE CONTROL MECHANISM
Filed Jan. 27, 1941
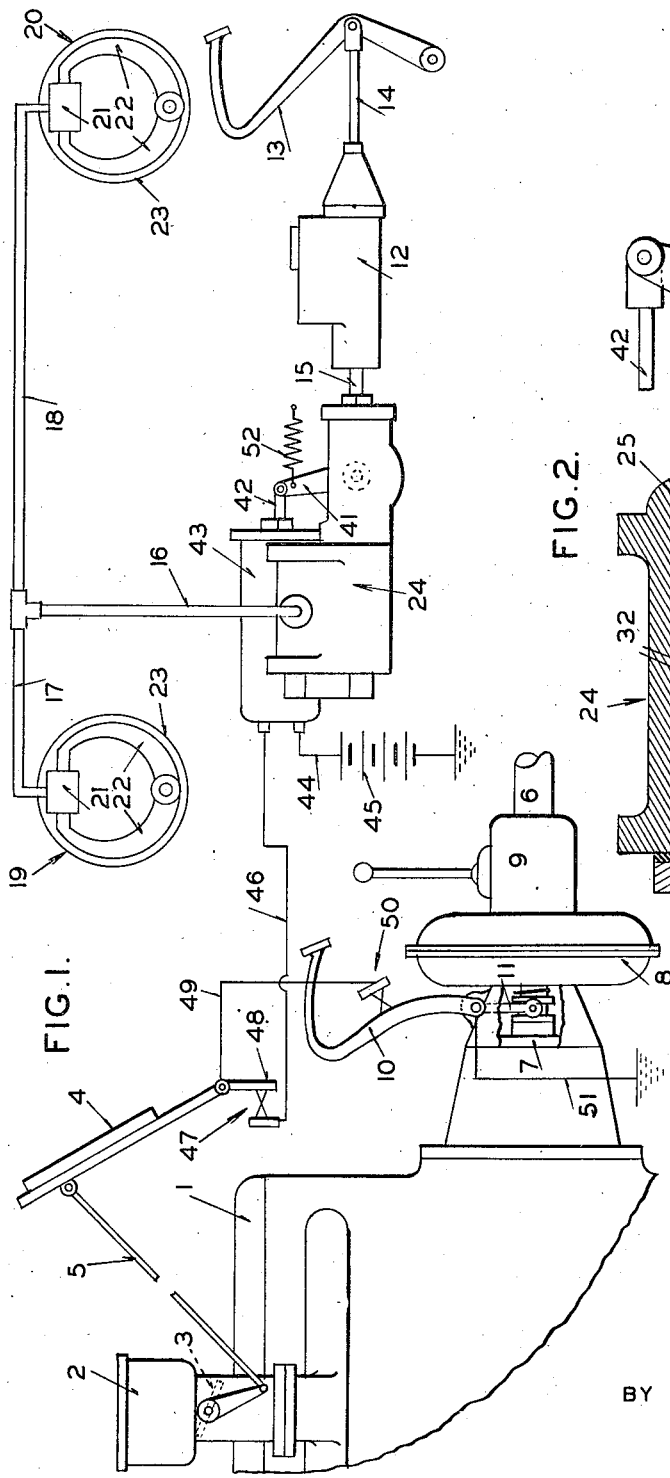
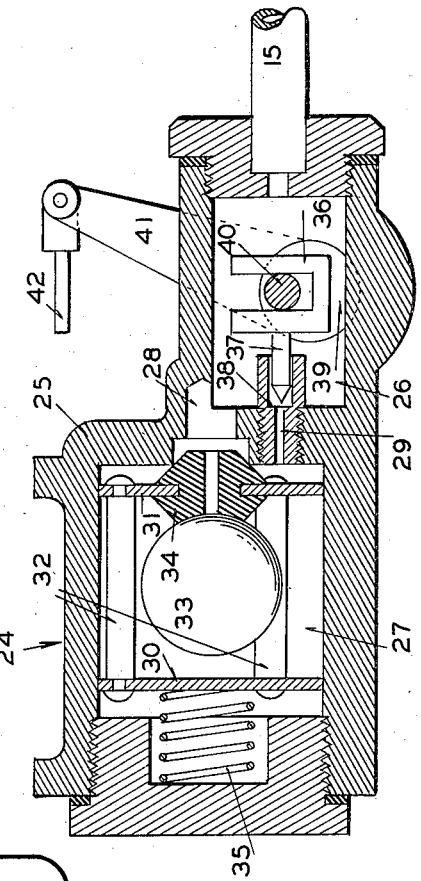
INVENTOR
W.R. FREEMAN
BY
E. E. Huffman
ATTORNEY Patented Mar. 24, 1942

2,277,584

UNITED STATES PATENT OFFICE 2,277,584

BRAKE CONTROL MECHANISM

Walter R. Freeman, Clayton, Mo., assignor to Wagner Electric Corporation, St. Louis, Mo., a corporation of Delaware Application January 27, 1941, Serial No. 376,047

14 Claims. (Cl. 192—.01)

My invention relates to brakes and more particularly to means for holding the brakes applied under certain conditions.

One of the objects of my invention is to provide a braking system of a motor vehicle with brake holding means and to so control said means by the clutch control mechanism of the vehicle that under certain conditions it will be operable when the clutch is engaged and inoperative when the clutch is disengaged.

Another object of my invention is to provide a brake holding means especially for a motor vehicle which is provided with a fluid coupling and a clutch as part of the power transmission means between the engine and the wheels and so control said holding means by the engine accelerator mechanism and the clutch control mechanism of the vehicle that it will be operative and inoperative when such conditions are most desirable.

Other objects of my invention will become apparent from the following description taken in connection with the accompanying drawing in which Figure 1 is a schematic view showing a braking system provided with a brake holding means and control means therefor embodying my invention, and Figure 2 is a sectional view of the brake holding valve means.

Referring to the drawing in detail, the numeral 1 indicates a vehicle engine having the usual carburetor 2 and throttle valve 3 for varying the amount of gasoline fed to the engine. The valve is actuated by an accelerator pedal 4 pivoted in the operator's compartment of the vehicle and connected to the valve by a rod 5. The engine is connected to the propeller shaft 6 for driving the vehicle wheels (not shown) by a friction clutch 7, a fluid coupling 8 of the Föttinger type, and a change speed gearing 9. The clutch is controlled by a pivoted pedal 10 and a clutch actuating arm 11. The clutch in the power transmission system shown is used only to completely disconnect the engine from the propeller shaft since the fluid coupling transmits little power when the engine is idling and, therefore, gear shifting can be accomplished without declutching as would be necessary if the fluid coupling were not employed.

The braking system shown schematically comprises a master cylinder 12, the piston (not shown) of which is actuated by the brake pedal 13 and piston rod 14, said pedal being positioned in the operator's compartment together with the accelerator and clutch pedals. The outlet of the master cylinder is connected by conduits 15 and 16 and branch conduits 17 and 18 to supply fluid (liquid) under pressure to actuate the braking assemblies 19 and 20 (two only being shown). Each of the brake assemblies comprises an actuating motor 21 for the brake shoes 22 whereby these shoes may be moved into engagement with the drum 23 secured to the vehicle wheel.

The holding means for the braking system comprises valve means 24 interposed between the conduits 15 and 16. This valve means is shown in detail in Figure 2 and includes a casing 25 having two chambers 26 and 27 interconnected by two passages 28 and 29, the chamber 26 being connected to the conduit 15 leading from the master cylinder and the chamber 27 connected to the conduit 16 leading to the brake assemblies. Within chamber 27 is a cage comprising end plates 30 and 31 and connecting rods 32 (two only being shown), the lower two of which serve as a track for a ball 33. The end plate 31 carries an annular valve element 34 which is normally biased against the open end of passage 28 by means of a spring 35 acting on the other end plate 30. The valve element also cooperates with the ball and when this ball engages said element, fluid cannot flow from chamber 27 to chamber 26. Fluid can flow in the opposite direction, however, since the fluid pressure will unseat the ball.

In the chamber 26 is a member 36 carrying a needle valve 37 for closing the passage 29 by engaging a seat 38. The member 36 is actuated by a shaft 39 having an eccentric portion 40. The outer end of the shaft carries an arm 41 which is connected by a rod 42 to the plunger of a solenoid 43 secured to the casing 25 of the valve means.

One terminal of the winding of the solenoid is connected by a conductor 44 to a grounded battery 45. The other terminal of said solenoid winding is connected by a conductor 46 to a switch 47, the movable contact 48 of which is carried by the accelerator pedal 4. This switch is normally closed when the accelerator pedal is in "off" position as shown, i. e., engine idling position. A conductor 49 leads from the switch 47 to a second switch 50, the movable contact of which is carried by the clutch pedal 10. This second switch is normally closed when the clutch pedal is in clutch-engaged position as shown. A grounded conductor 51 completes the circuit.

When the holding valve means is installed on a vehicle, it is so positioned that the track formed by the rods 32 extends longitudinally of the vehicle and preferably slightly inclined upwardly toward the front of the vehicle when said vehicle is on a horizontal roadway. The inclination may be from 1 to 3 degrees or even less. With the valve means so installed, it is seen that when the vehicle is stopped on a level roadway or facing upward on an inclined roadway, the ball 33 will engage the valve element 34. If the clutch is engaged and the accelerator mechanism is in "off" position under these conditions, the switches 47 and 50 will be closed, the solenoid energized, and the needle valve 37 held seated. Figure 1 shows the solenoid energized. If the brakes have been applied, they will be so held even if the brake pedal is released since fluid cannot return to the master cylinder. If the brakes are not applied, they may be applied by depressing the brake pedal. Fluid under pressure can be transmitted to the brake assemblies as the ball 33 can be forced off its seat to permit passage of fluid through passage 28. The fluid transmitted will then be trapped. It is to be noted that the passage 29 is very small and, therefore, the needle valve can be held seated against large trapped fluid pressure without leakage and by means of only a small force. The pulling force of the solenoid acting through the leverage of arm 41 and the eccentric, is found sufficient.

If the vehicle is moving along a roadway and the accelerator mechanism is released to "off" position, the brakes may be applied and released at will without any holding action by the valve means and notwithstanding both switches are closed and the solenoid energized. The action of inertia during deceleration of the vehicle (which takes place at the time the accelerator is released and engine braking is effective and which is increased when the brakes are applied) causes the ball to roll forwardly and be held away from the valve element 34. Thus fluid is free to pass through the passage 28 in both directions. It is only when the vehicle is brought to a stop on a level or an upwardly inclined roadway that the holding valve means will be effective to hold the brakes applied after having been applied by the master cylinder and then only if the switches 47 and 50 are closed.

When it is desired to start the vehicle from a stopped position with the brakes held applied, the accelerator pedal will be depressed preparatory to starting. This will break the circuit and deenergize the solenoid. The trapped fluid pressure will then unseat the needle valve (Figure 2) and permit release of the trapped brake fluid. If desired, a spring such as spring 52 (Figure 1) may be employed to obtain a quick unseating of the needle valve when the solenoid is deenergized.

Under normal driving and stopping conditions the clutch 7 is seldom disengaged when it is associated with a fluid coupling of the Föttinger type and, therefore, the switch 50 is normally closed at all times. The clutch need not be disengaged when the vehicle is stopped or when gear changing is done since the fluid coupling, as is well known, transmits very little torque with the engine idling. The clutch, however, is always disengaged when the gearing is shifted to a reverse gear preparatory to backing up. If the brakes should be held applied when it is desired to back up, they will be automatically released by the disengagement of the clutch. Thus there will be no possibility of attempting to back up the vehicle with the brakes applied. Of course, if power from the engine is used to back up the vehicle, the depressing of the accelerator will release the brakes if held applied. The release of the brakes by disengaging the clutch, however, is found to be very useful when it is desired to let the vehicle freely roll back as, for example, in parking on a forwardly inclined street. As soon as the clutch is disengaged to permit rolling, the brake holding valve means will be ineffective and the roll of the vehicle can be controlled by the brake pedal, applying and releasing the brakes at will.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a motor vehicle provided in its power transmitting means with a clutch mechanism and a torque transmitting means having a slip characteristic, and with a braking system including an operator-operated control means, means for holding the brakes applied after said brakes have been applied by operation of the operator-operated control means and notwithstanding said control means is placed in normally inoperative condition, and control means including means so associated with the clutch mechanism as to cause the holding means to be inoperative when said mechanism is in clutch disengaged position.

2. In a motor vehicle provided in its power transmitting means with a clutch mechanism and a torque transmitting means having a slip characteristic, and with a fluid pressure braking system including a source of pressure, an actuating motor and a conduit for placing the motor in communication with the source, valve means associated with the conduit means for trapping fluid in the motor and maintaining the brakes applied, and control means for the valve means including means so associated with the clutch mechanism as to cause the valve means to be inoperative when said mechanism is in clutch disengaged position.

3. In a motor vehicle provided in its power transmitting means with a clutch mechanism and a torque transmitting means having a slip characteristic, and with a braking system including an operator-operated control means, means for holding the brakes applied after said brakes have been applied by operation of the operator-operated control means and withwithstanding said control means is placed in normally inoperative condition, and control means for said holding means comprising a solenoid, an electrical circuit for energizing said solenoid, and a switch for the circuit which is so associated with the clutch mechanism as to break the circuit when the clutch mechanism is moved to clutch disengaged position.

4. In a motor vehicle provided in its power transmitting means with a clutch mechanism and a torque transmitting means having a slip characteristic, with an accelerator mechanism and with a braking system including an operator-operated control means, means for holding the brakes applied after said brakes have been applied by operation of the operator-operated control means and notwithstanding said control means is placed in normally inoperative condition, and control means for said holding means comprising a solenoid, an electrical circuit for energizing said solenoid and two switches for the circuit, one of said switches being so associated with the clutch mechanism as to be opened when said mechanism is in clutch disengaged position, and the other of said switches being opened when the accelerator mechanism is moved to an operative position.

5. In a motor vehicle provided in its power transmitting means with a clutch mechanism and a torque transmitting means having a slip characteristic, and with a braking mechanism, means for holding the brakes applied, control means so associated with the clutch mechanism as to cause the holding means to be inoperative whenever the mechanism is in clutch disengaged position, and other control means for causing the holding means to be inoperative at will.

6. In a motor vehicle provided in its power transmitting means with a clutch mechanism and a torque transmitting means having a slip characteristic, with an accelerator mechanism and with a braking mechanism, means for holding the brakes applied, control means so associated with the clutch mechanism and with the accelerator mechanism as to cause the holding means to be inoperative whenever either the clutch mechanism is in clutch disengaged position or the accelerator mechanism is in an operative position.

7. In a motor vehcle provided in its power transmitting means with a clutch mechanism and a torque transmitting means having a slip characteristic, and with a fluid pressure braking system including a source of pressure, an actuating motor and a conduit for placing the motor in communication with the source, valve means associated with the conduit means for trapping fluid in the motor and maintaining the brakes applied, and control means for the valve means including means controlled by the action of inertia during deceleration of the vehicle for causing the valve means to be inoperative and other means so associated with the clutch mechanism as to cause the valve means to be inoperative when said mechanism is in clutch disengaged position.

8. In a motor vehicle provided with an engine accelerator mechanism, with a clutch mechanism and a torque transmitting means having a slip characteristic, and with a braking system, means for holding the brakes applied, and means for controlling said holding means by both the accelerator mechanism and the clutch mechanism, said means being so associated with the said mechanisms as to cause the holding means to be operative when the accelerator mechanism is in "off" position and the clutch mechanism is in clutch engaged position and inoperative when either the accelerator mechanism is moved to an operative position or the clutch mechanism is moved to a clutch disengaged position.

9. In a motor vehicle provided with an engine accelerator mechanism, with a clutch mechanism and a torque transmitting means having a slip characteristic, and with a braking system, means for holding the brakes applied, means for causing the holding means to be inoperative when the vehicle is decelerating, and other means for controlling said holding means by both the accelerator mechanism and the clutch mechanism, said means being so associated with the said mechanisms as to cause the holding means to be operative when the accelerator mechanism is in "off" position and the clutch mechanism is in clutch engaged position and inoperative when either the accelerator mechanism is moved to an operative position or the clutch mechanism is moved to a clutch disengaged position.

10. In a motor vehicle provided with an engine accelerator mechanism, with a clutch mechanism and a torque transmitting means having a slip characteristic, and with a fluid pressure actuated braking system, valve means associated with the braking system for preventing release of the brakes from applied position, means including a solenoid for causing said valve means to be in closed position when the solenoid is energized, and an electrical circuit for said solenoid including two switches in the circuit, one of said switches being so associated with the accelerator mechanism as to be closed when said mechanism is in "off" position and open when said mechanism is operated to increase the speed of the engine, said other switch being so associated with the clutch mechanism as to be closed when the clutch is engaged and open when the clutch is disengaged.

11. In a motor vehicle provided with an engine having an accelerator mechanism, with a fluid pressure actuating braking system and with a transmission system between the engine and driving means embodying a fluid coupling of the Föttinger type and a clutch mechanism for complete disconnection, a valve associated with the breaking system for prevention release of the brakes from applied position, means including a solenoid for causing said valve to be closed when said solenoid is energized, and an electrical circuit for said solenoid including two switches in the circuit, one of said switches being so associated with the accelerator mechanism as to be closed when said mechanism is in "off" position and open when said mechanism is operated to increase the speed of the engine, and the other of said switches being so associated with the clutch mechanism as to be closed when the clutch is engaged and open when the clutch is disengaged to completely disconnect the engine from the driving means so that power is not transmitted through the fluid coupling.

12. In a motor vehicle provided in its power transmitting means with a clutch mechanism and a torque transmitting means having a slip characteristic, and with a braking system including a source of pressure, an actuating motor and conduit means for connecting the source to the motor, valve means for said conduit means comprising one valve caused to be closed when the vehicle is stopped and held open under the action of gravity when the vehicle is decelerating and a second valve, and control means for said second valve including means for causing the valve to be open when the clutch mechanism is in clutch disengaged position.

13. In a motor vehicle provided with a braking system and with a power transmission system between the engine and wheels including a fluid coupling permitting changing of gears when the engine of the vehicle is idling and without complete disconnection of power and a clutch mechanism for completely preventing the transmission of power, means for holding the brakes applied, and means for controlling said holding means comprising means for causing the holding means to be inoperative when the clutch mechanism is in clutch disengaged position.

14. In a motor vehicle provided with a braking system and with a power transmission system between the engine and wheels including a fluid coupling permitting changing of gears when the engine of the vehicle is idling and without complete disconnection of power and a clutch mechanism for completely preventing the transmision of power, means for holding the brakes applied, and means for controlling said holding means comprising means for causing the holding means to be inoperative when the clutch mechanism is in clutch disengaged position and other means for causing the holding means to be inoperative at will.

WALTER R. FREEMAN.